Sept. 21, 1954  M. P. KULP ET AL  2,689,784
APPARATUS FOR PRODUCING CELLULOSE XANTHATE
Original Filed Feb. 7, 1946  5 Sheets-Sheet 1

Fig. 1

INVENTORS.
MAURICE P. KULP
CHARLES D. VANDENBURGH
DOROTHY C. CHANCE
BY Thomas R. O'Malley Patented Sept. 21, 1954

2,689,784

UNITED STATES PATENT OFFICE 2,689,784

APPARATUS FOR PRODUCING CELLULOSE XANTHATE

Maurice P. Kulp, Marcus Hook, Pa., Charles D. Vandenburgh, Charlestown, Md., and Dorothy C. Chance, Ridley Park, Pa., assignors to American Viscose Corporation, Wilmington, Del., a corporation of Delaware Original application February 7, 1946, Serial No. 646,048. Divided and this application May 11, 1948, Serial No. 26,354

21 Claims. (Cl. 23—260)

This invention relates to an improved process for the production of cellulose xanthate, and to novel apparatus which may be used in carrying out the process.

This application is a division of our pending application Serial No. 646,048, filed February 7, 1946, now Patent No. 2,510,984.

The known, and currently practiced, method of making cellulose xanthate involves dumping alkali cellulose crumbs into a xanthating drum containing liquid carbon disulfide or into which the carbon disulfide is poured after introduction of the crumbs. The mixture is then agitated or churned for a considerable period of time, chemical reaction taking place during the agitating period. The main disadvantage of that process is that chemical reaction between $CS_2$ and the alkali cellulose takes place rapidly at the surface of the crumbs, which then become sticky and viscid and agglomerate into lumps or coherent masses of varying sizes which adhere to the churning mechanism and to the inner walls of the drum. The agitation is thus greatly impeded, and the carbon disulfide does not penetrate into the interior of the crumbs, especially those of larger size, which thus have a surface of cellulose xanthate encasing a core of unreacted alkali cellulose, and the final product does not consist entirely of cellulose xanthate. It is practically impossible to obtain uniform distribution of the carbon disulfide through all portions of the alkali cellulose crumbs under such conditions. To even partially offset these difficulties, a large excess of carbon disulfide is required, all of which is not used up in the reaction and some of which is present in the final product when it is removed from the xanthating drum or the like. When the crumbs are dissolved in dilute sodium hydroxide, to produce viscose, in the conventional manner, the excess carbon disulfide carried by the crumbs, but not distributed therethrough, reacts with the caustic to form by-products which must be removed prior to spinning the viscose and which if not removed complicate the filtering step and impair the properties of products obtained by subjecting the viscose to coagulating and regenerating conditions. In addition, such prior art methods are essentially batch processes, rather than continuous processes, and require such a considerable handling of material that they are not at all well suited to large scale commercial use.

It is an object of this invention to provide an improved method of producing cellulose xanthate, in which the formation of viscid clumps is avoided during mixing of the alkali cellulose crumbs and carbon disulfide, and which insures intimate and uniform distribution of the carbon disulfide through all portions of the alkali cellulose. Another object is to provide a method of making cellulose xanthate which does not involve the use of large excesses of carbon disulfide. Yet another object is to provide a method of making a predetermined amount of cellulose xanthate, in a predetermined unit of time. A still further object is to provide a continuous method for making cellulose xanthate, and apparatus in which such a continuous process may be carried out.

Essentially, this invention contemplates the production of an intimate physical mixture of atomized carbon disulfide and alkali cellulose by agitating alkali cellulose crumbs and an amount of atomized carbon disulfide equal to the amount thereof consumed in the chemical reaction for a limited period of time such as to insure uniform distribution of the liquid through all parts of the solid, without the occurrence of any appreciable chemical reaction, and thereafter maintaining the mixture under conditions such that there is comparatively little if any agitation of the mass or movement of the crumbs relatively to one another for a predetermined period of time which is of such duration that the physically well-intermingled alkali cellulose and carbon disulfide react together chemically to yield a final product which consists substantially entirely of cellulose xanthate and which does not comprise any significant quantity of unreacted alkali cellulose. The carbon disulfide is added to the alkali cellulose crumbs in atomized form, that is, in the form of a fine mist or cloud, to effect thorough distribution thereof through the crumbs during the limited agitation period.

It is thus possible to reduce the quantity of carbon disulfide mixed with the alkali cellulose to substantially that amount required to convert a given quantity of alkali cellulose to cellulose xanthate. It appears that chemical reaction is not initiated during the agitating period, or at any rate that the extent of the chemical reaction, if it is initiated at that point, is insufficient to cause lumping of the particles or prevent thorough penetration of the carbon disulfide through all of the particles.

The process permits of a considerable saving in the overall time required to produce cellulose xanthate and favorably influences the character of the viscose obtainable therefrom by dissolving the xanthate in dilute caustic alkali, and of products obtainable by spinning or casting such viscose into suitable coagulating and regenerating media.

The accompanying drawing illustrates apparatus which is suitable for carrying out the process. In the drawing.

Referring more particularly to Figures 1 to 4 inclusive, there is shown a tower-like chamber 2 supported in a framework comprising a platform 3 mounted on uprights 4 and 5 reinforced by cross-bars 6 and 7.

Chamber 2 comprises an agitating zone 8 the bottom of which communicates with the top of a reaction or rest zone 9, and a communicating juncture, shown generally at 10, is provided between the zones. Either the agitating or the rest zone, or both, may be provided with jackets for heating or cooling the contents of the zones, if desired.

Alkali cellulose crumbs are fed into the agitating zone through a hopper 11, and carbon disulfide is introduced into the agitating zone, in the form of a fine mist or cloud, through the nozzles of an atomizer 12.

A shaft 14 projects into the agitating zone and carries a number of blades 15 fixed thereto for mixing the alkali cellulose crumbs and carbon disulfide, shaft 14 being driven by a motor 16 connected to a suitable source of power.

The communicating juncture between the two zones 8 and 9 (see Figures 1, 2 and 3) comprises an oval-shaped flange 17 and an oval-shaped flange 18, the flanges being bolted together by bolts 19 with a spacing member 20 interposed therebetween. Spacing member 20 has an opening 20a corresponding in diameter to the inner diameter of the reaction zone, or to the inner diameter of both the agitating and reaction zones when they are the same size, and is provided with a longitudinal guideway 21 extending radially outwardly from the opening 20a and lying between a pair of opposed shelves 22 and 23 which have less thickness than the member 20 so that the lowermost one of the circular plates or separators 24 within the magazine 25 can rest upon the shelves and can be slid along the shelves into the opening 20a. The magazine 25 is carried by the projecting portion of flange 17.

The rod 26, extending from a piston slidable in a cylinder 26a mounted on a bracket 17a is secured to and is adapted to move a crescent-shaped shoe 27, the shoulder 28 of which abuts against the edge of the bottom plate in magazine 25. When rod 26 is pushed inwardly along guideway 21, shoe 27 forces the bottom plate of the stack along shelves 22 and 23 until the plate is brought into position between zones 8 and 9 where it is supported by shoes 31 and 32 projecting into the opening 20a. The rod 26 is capable of being retracted to again bring shoulder 28 into position back of the next plate in the stack. In this position, the plates 20 act as closure members between the agitating chamber 8 and the reaction tower 9.

The shoes 31 and 32 are carried by reciprocable rods 29 and 30 respectively. Springs 29a and 30a acting upon collars or shoulders fixed to rods 29 and 30 serve to retract the shoes from their plate supporting positions.

The means for supporting the plate 24 at the discharge end of zone 9 (Figure 1) comprises a pair of shoes 35 and 36 carried by a pair of reciprocable rods 33 and 34 extending from pistons slidable in cylinders 33a and 34a. Retraction of rods 33 and 34 releases the plate, which is discharged from the reaction zone onto a platen 37 adapted to be lowered to the surface of a stationary support 38. The platen is steadied by guide posts 39 which reciprocate vertically in guideways 39a in support 38. Raising or lowering of platen 37 is effected by means of a rod 40 extending from a piston slidable in a cylinder 40a and secured to the bottom of the platen. In its upper position, the platen is maintained in position immediately under the discharge end of reaction zone 9. Retraction of rod 40 causes platen 37 to be lowered until it comes to rest on support 38.

Figure 4:
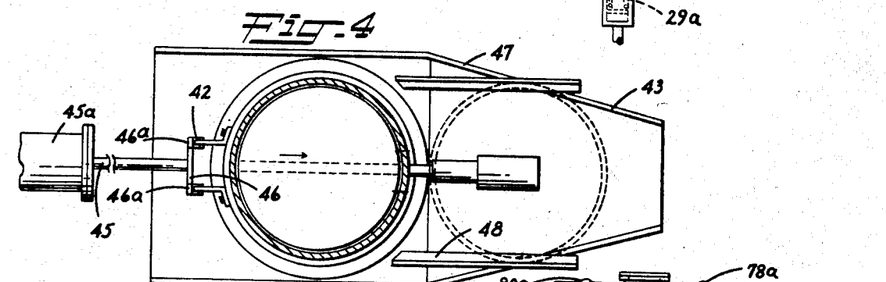
Figure 4 is a view taken on line IV—IV of Figure 1.

Platen 37 carries a detached upstanding ring member 41 on its upper surface, which ring surrounds the plate deposited on the platen from the reaction zone. The ring is provided with a pair of projecting hooks 42. Means are provided for urging the ring 41 across the surface of platen 37, whereby the plate and its load are swept into a chute 43 which may lead to a hopper (not shown). Thus, there is provided a rod 45 secured to a piston slidable in a cylinder 45a. When platen 37 is in its lower position, each hook 42 on ring 41 extends downwardly into the space between two upstanding lugs 46a carried upon the end of the rod 45 so that motion of rod 45 effects movement of ring 41 through lugs 46a and hooks 42. Opposed angle irons 47 and 48 provide a guideway for supporting ring 41, but not plate 24 and its load, when they are moved to the right as shown in Figure 4, thereby dumping plate 24 and its load down the chute 43. Retraction of rod 45 pulls ring 41 back to its original position on platen 37.

During operation of the apparatus, the reaction zone 9 is normally filled with a plurality of batches from the agitating zone, the batches being thus separated from each other and moving intermittently downwardly through the reaction zone. The plates pile up above platen 37 which is in receiving position at the discharge end of the tower with ring 41 surrounding the lower end of the tower. When the chemical reaction between the alkali cellulose and carbon disulfide comprising the batch carried on the lowermost plate is complete and the plate is ready to be removed from the vicinity of the reaction zone, shoes 35 and 36 are inserted under the next to last plate in the pile, in order to support all of the plates and batches except the lowermost one, which drops onto the platen and is withdrawn with the platen to dumping position. After dumping, the platen is again raised to the receiving position against the lower opening of the tower. Shoes 35 and 36 are again released to permit all of the batches in the tower to fall upon the platen after which the shoes are again inserted under the next to last plate. As each plate and batch in the stack is brought, in turn, to the lowermost position on the platen, a new plate and a fresh batch drops into the upper end of the reaction zone from the agitating zone so that all of the batches and the partitioning plates which both support and separate the batches shift intermittently downwardly through the reaction zone to the discharge end thereof.

Figure 3:
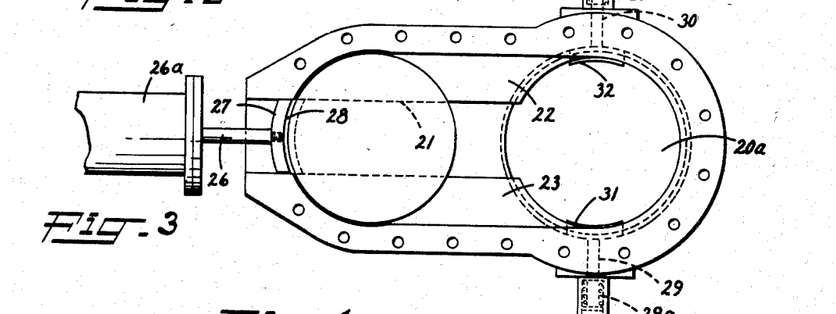
Figure 3 is a view taken on line III—III of Figure 2.
Figures 5, 6:
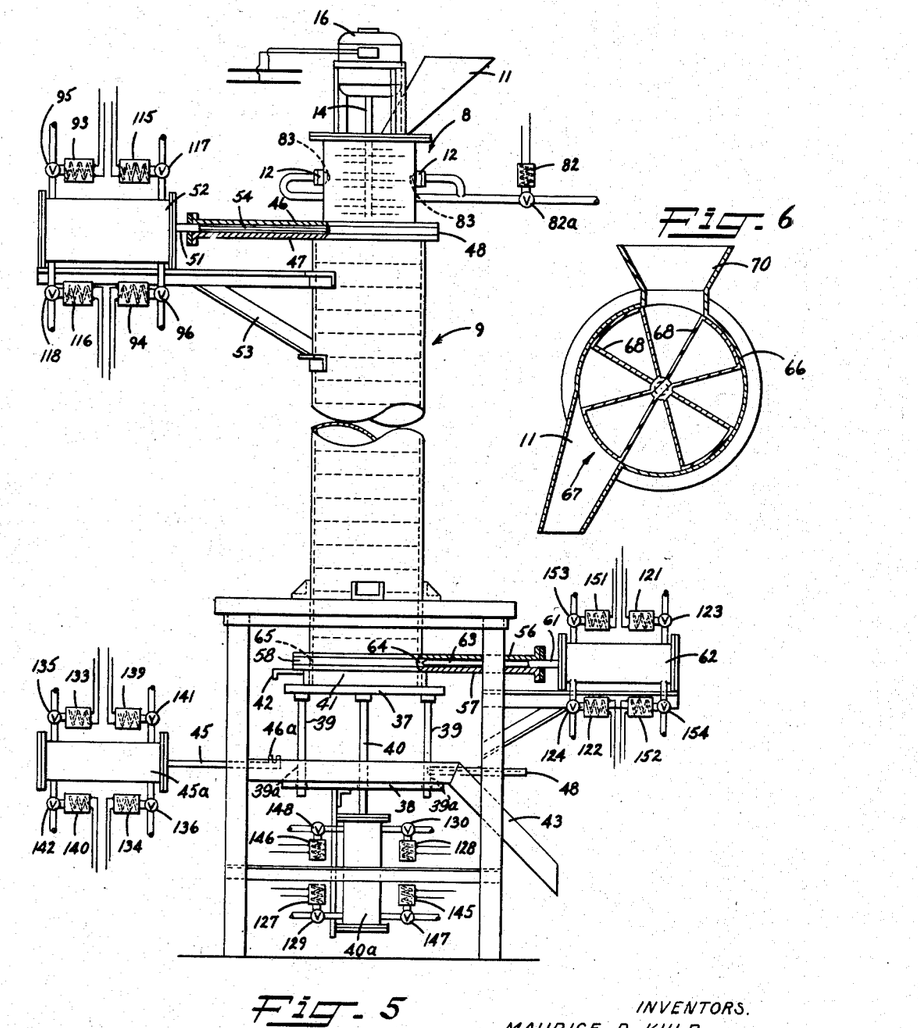
Figure 5 is an elevation of part of a device embodying another modification of the invention.
Figure 6 is a detail of a portion of the apparatus shown in Figures 1 and 5.

Figure 5 is illustrative of another embodiment of the invention. In that embodiment, the apparatus comprises an agitating zone 8 and a reaction zone 9, and a communicating juncture between the two comprising oval-shaped flanges 46 and 47 having a spacing member 48 interposed therebetween, and having an opening corresponding in diameter to the inner diameter of the reaction zone, or to the inner diameter of both the agitating and reaction zones when they are the same size, and similar to the opening 20a (Figure 3) and a longitudinal guideway extending radially outwardly from the opening and similar to guideway 21 (Figure 3). A rod 51 extending from a piston slidable in cylinder 52 supported on bracket 53 is secured to and adapted to move a circular disk member 54. When rod 51 is pushed inwardly along the guideway, the disk member 54 is brought into position between the agitating and rest zones and serves as a temporary seal therebetween. Rod 51 remains in position to retain disk member 54 in sealing position between the zones, until the alkali cellulose and carbon disulfide have been intimately mixed in the agitating chamber and the physical mixture is ready to be introduced into the rest zone. At that time, rod 51 is retracted so that disk member 54 is withdrawn, which permits the batches to drop downwardly through the reaction zone, the lowermost batch coming to rest upon platen 37 at the discharge end of the reaction zone. Platen 37 is adapted to be lowered to the surface of a stationary support in a manner and by means similar to that described in connection with Figure 1.

Surrounding the reaction zone, at the discharge end thereof, are flanges 56 and 57 having a spacing member 58 interposed therebetween. The spacing member is provided with an opening which corresponds with the inner diameter of the reaction zone, and which is similar to opening 20 (Figure 3) and with a longitudinal guideway extending radially outwardly from the opening. A rod 61 extending from a piston slidable in cylinder 62 is secured to and adapted to move a circular disk member 63, the diameter of which corresponds to the inner diameter of the reaction compartment. When rod 61 is pushed inwardly along the guideway, disk member 63 is brought into position under the next to lowermost batch in the reaction zone. The disk member is provided with an upstanding projection 64 which fits into a recess 65 in the interior wall of the reaction compartment so that the disk is held securely in place. The disk member 63, when inected between the lowermost batch resting on the platen at the discharge end of the reaction zone and the remaining batches serves to support all of the batches except the lowermost one in the reaction compartment and to effectively prevent the escape of carbon disulfide gas from the chamber. After injection of the member 63, the platen 37 is lowered to dumping position.

After dumping of the withdrawn batch, the platen is returned to receiving position at the discharge end of the reaction zone. Rod 61 is then retracted so that member 63 is withdrawn, and the lowermost batch in the reaction zone falls onto the surface of the platen, causing all of the batches to shift downwardly through the reaction zone. The sequence of operations is similar to that described in connection with Figures 1 to 4, that is, as each successive batch of cellulose xanthate is withdrawn from one end of the reaction zone, a fresh batch consisting of a physical mixture of alkali cellulose and carbon disulfide is introduced into the other end of the reaction zone, and all of the batches shift intermittently downwardly through the reaction zone.

Figure 1:
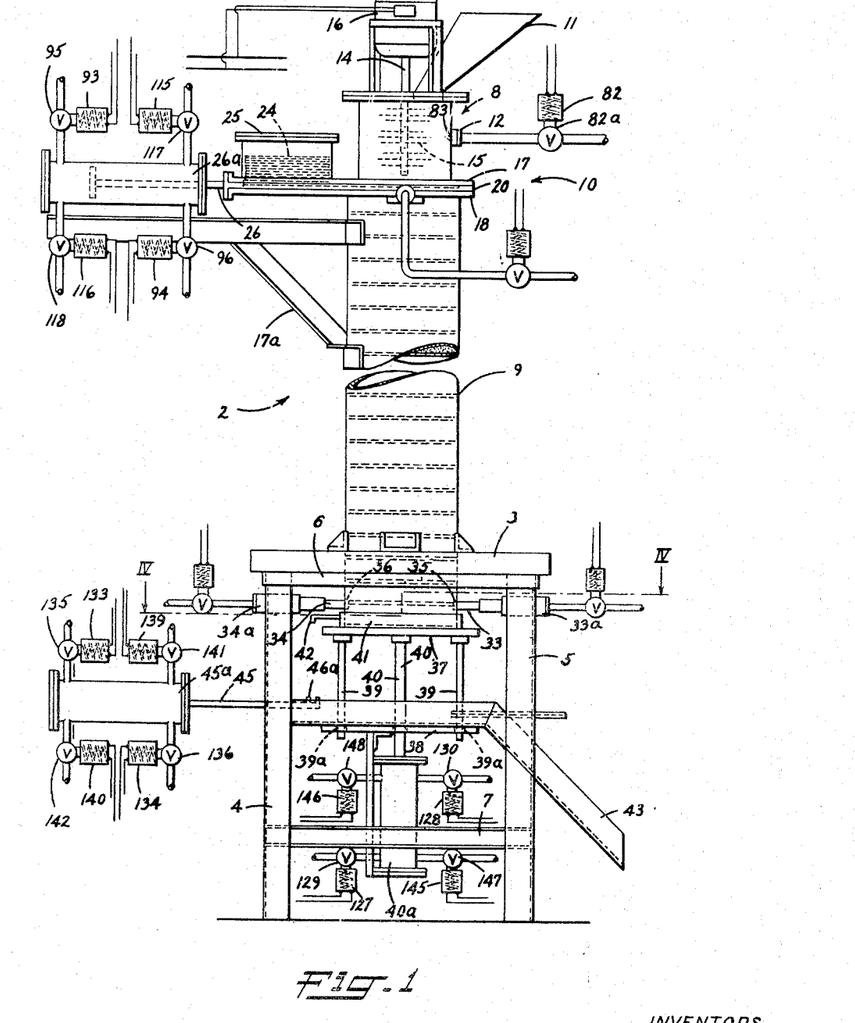
Figure 1 is an elevation of one embodiment of the invention.
Figure 2:
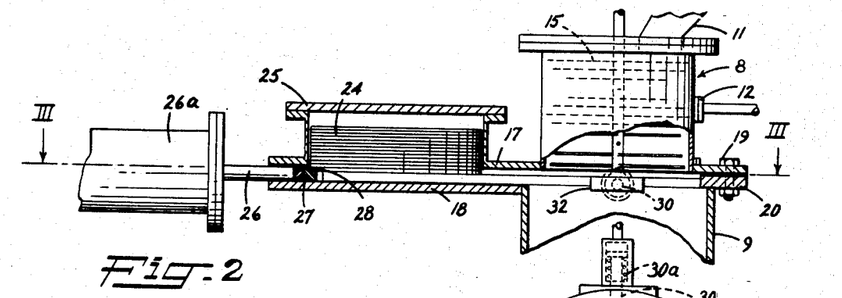
Figure 2 is an elevation of the upper portion of the apparatus of Figure 1 shown partly in section.

Referring now to Figure 6, there is shown in detail means for introducing alkali cellulose crumbs into the agitating compartment of the apparatus shown in Figures 1 and 5 while at the same time minimizing leakage of carbon disulfide from the compartment. As shown, there is provided a chamber 66 having a freely rotatable disk-like member 67 inserted therein. Member 67 is divided into a series of alternate open and closed sections by a series of spaced radially extending partitions 68. The open and closed sections communicate alternately with the open top of the hopper 11 and the open bottom of the chute 70.

The angular disposition of the partitions 68 relative to each other is such that the weight of the crumbs introduced from chute 70 is sufficient to effect rotation of the member 67, so as to bring the open-ended sections of the member into register successively with hopper 11 alternately with closed sections of the member. When an open section of member 67 is in register with the chute 70, a closed section is in register with the hopper 11 leading to the agitating compartment, and vice-versa, which prevents leakage of any appreciable quantity of carbon disulfide to the chute and to the atmosphere.

Figure 7:
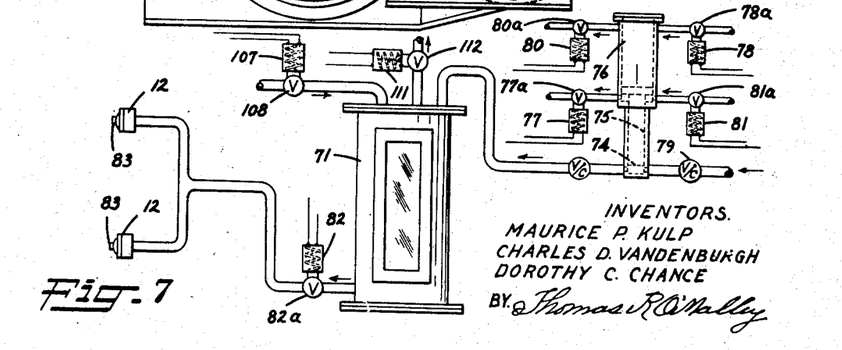
Figure 7 is a detail of another portion of the apparatus of Figures 1 and 5.

Figure 7 illustrates a device which may be used for accurately measuring the amount of carbon disulfide introduced into the agitating zone. The device is operated as follows: The tank 71 is filled with water, and valve 108 is opened so that liquid carbon disulfide can be run into the tank, displacing the water which escapes, valve 112 being also open. Plunger 74 which projects into a casing 75, and which is carried on the end of a rod extending from a piston slidable in cylinder 76 is then retracted to a predetermined extent by opening valves 77a and 78a. A predetermined quantity of water is drawn into the casing 75 whereupon check valve 79 is closed, so that valves 80a and 81a are opened, and the water is forced out into tank 71 where it displaces an equivalent amount of carbon disulfide which, by opening of valve 82a is thus forced through nozzles 83 of the atomizer 12 into the agitating compartment. The extent of retraction of plunger 74 from casing 75 controls the amount of water drawn into the casing which in turn controls the amount of $CS_2$ sprayed into the agitating compartment. By thus controlling the proportion of carbon disulfide sprayed into the agitating compartment by hydraulic pressure, a very accurate control is maintained, and the introduction of excess carbon disulfide is avoided. Of course, the carbon disulfide may be introduced into the agitating compartment in controlled amounts sufficient to permit intimate physical intermingling with the alkali cellulose by other suitable means, if desired.

The various coacting elements of the apparatus may be operated by any suitable means. Thus they may be manually operated by means of levers or the like. However, as shown herein, the apparatus is electrically operated and set so that the several operations are carried out sequentially and in a predetermined unit of time.

Figure 8:
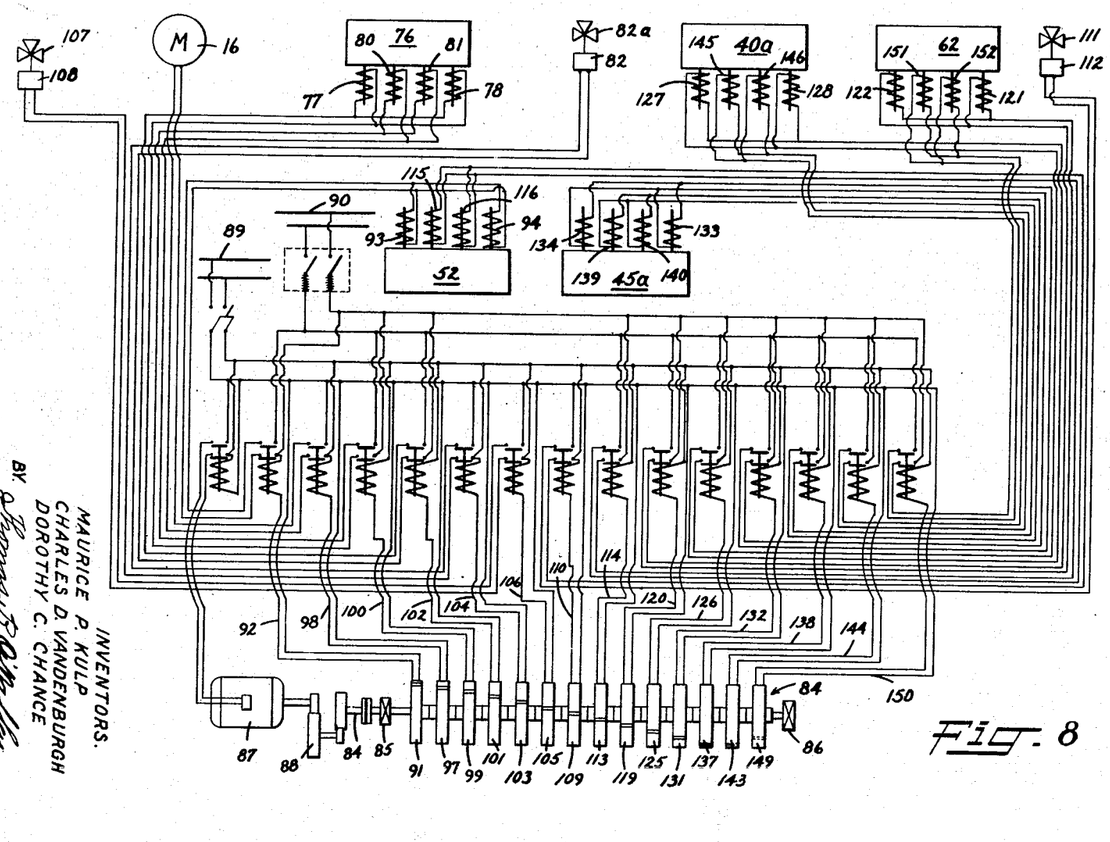
Figure 8 is a diagrammatic representation of the electrical connections used in operating the apparatus.

Figure 8 is illustrative of electrical connections which may be used in operating the apparatus shown in Figure 1. In Figure 8, there is shown a shaft 84 having a number of contact disks mounted thereon. Each disk is of insulating material and its periphery is provided with a metallic insert. The shaft is supported in bearings 85 and 86 and driven by a motor 87 through reduction gearing 88. As shaft 84 rotates, the metallic inserts in the contact disks are brought successively into contact with respective leads or terminals for actuating a plurality of solenoids to close and open switches for establishing and breaking a plurality of electrical circuits in desired sequence.

Referring to Figures 8 and 5, at the start of operations, master switches 89 and 90 are closed, whereupon motor 87 is started, and shaft 84 begins to rotate. The metallic insert 91 is brought into contact with lead lines 92, causing solenoids 93 and 94 to open valves 95 and 96, to force rod 51 carrying disk member 54 out of its cylinder 52 to bring member 54 into position at the bottom of zone 8 and between the zones.

Metallic insert 99 contacts lead lines 100, so that solenoids 77 and 78 open valves 77a and 78a, causing plunger 74 to be retracted a predetermined extent. Insert 101 then contacts lead lines 102 causing solenoids 80 and 81 to open valves 80a and 81a, and at the same time insert 103 contacting lead lines 104 actuates solenoid 82 to open valve 82a, and CS$_2$ is forced through nozzles 83. Metallic insert 105 contacts lines 106 so that solenoid 108 opens valve 107 to permit the introduction of CS$_2$ to tank 71, while insert 109, contacting lines 110 causes solenoid 111 to open valve 112 so that water may escape from the tank.

The alkali cellulose crumbs and atomized carbon disulfide are agitated in zone 8 for a predetermined period of time which is sufficient to effect intimate physical intermingling thereof, but insufficient to permit chemical reaction therebetween. When the agitator is stopped, insert 113, in contact with lines 114, energizes solenoids 115 and 116 to open valves 117 and 118 so that rod 51 is retracted, and the batch drops into the reaction compartment 9. Metallic insert 119, contacting lead lines 120 causes solenoids 121 and 122 to open valves 123 and 124 so that rod 61 carrying disk member 63 is pushed out of cylinder 62, and member 63 is brought into position between the batch deposited on the platen and the batch immediately thereabove.

Metallic insert 125, contacting lead lines 126 causes solenoids 127 and 128 to open valves 129 and 130. Valve 129 introduces air under pressure above the piston on rod 40, and valve 130 discharges air, so that rod 40 is retracted and the platen comes to rest on support 38.

Contact of metallic insert 131 with lead lines 132 has the result that solenoids 133 and 134 open valves 135 and 136 to introduce air under pressure at one end of the cylinder 45a, behind the rod, and discharge air from the opposite end to force rod 45 against ring member 41. The ring is returned to position on the platen, when insert 137 contacts lead lines 138, causing the solenoids 139 and 140 to open valves 141 and 142 so that valve 141 introduces air under pressure at the front of the cylinder and valve 142 discharges air at the opposite end.

Metallic insert 143, contacting lead lines 144, causes solenoids 145 and 146 to open valves 147 and 148, so that platen 37 is forced upwardly into receiving position at the discharge end of reaction compartment 9, whereupon insert 149, contacting lines 150, energizes solenoids 151 and 152 to open valves 153 and 154, so that rod 61 is retracted withdrawing disk member 63. The batches shift downwardly through compartment 9 so that the lowermost batch comes to rest on platen 37.

As shown herein, the lead lines which are contacted by the metallic inserts controlling operation of solenoids 93 and 94, solenoids 115 and 116; 77, 78, 80 and 81, 121, 122, 151 and 152; 127, 128, 145 and 146; 133, 134, 139 and 140 are connected with a power line supplied by a single phase alternating current generator operating at 440 volts, while the lead lines which are contacted by the metallic inserts controlling operation of motor 87, motor 16, and solenoids 82, 107 and 111 are connected with a power line supplied by a single phase alternating current operating at 220 volts. It will be obvious, however, that all of the lead lines may be connected with a single power line, if desired.

By suitable adaptation of the electrical connections shown in Figure 8, the various coacting elements of the apparatus shown in Figure 5 may also be actuated sequentially. Thus the shaft 84 may be provided with the required number of contact disks having metallic inserts, energizing solenoids which in turn actuate the several elements of the device in sequential order and in a predetermined time interval.

In general, we have found that, for any given amounts of carbon disulfide and alkali cellulose, an agitating period of about three minutes is sufficient to permit even and thorough penetration of the carbon disulfide through the particulate alkali cellulose while avoiding chemical reaction therebetween, when the carbon disulfide is introduced in controlled quantity and in atomized condition, and the agitator shaft is driven at a speed of about 1700 R. P. M. The cellulose xanthate is produced by reaction between the alkali cellulose in the solid phase and the carbon disulfide in the gaseous phase. The time required to effect the reaction may vary somewhat but in general a reaction time of about two hours is sufficient. The heat generated in the reaction may be supplemented by the use of suitable jacketing means, if desired. Preferably, the reaction compartment is provided with a safety valve. After operation of the apparatus has been initiated, a physical mixture of alkali cellulose and atomized carbon disulfide is discharged from the agitating zone every three minutes, and a batch comprising the chemical reaction product, cellulose xanthate, is discharged from the reaction zone every three minutes. Under such conditions, the speed of motor 87 is controlled so that shaft 84 makes one complete revolution every three minutes. Preferably, the reaction zone is of such length that about two hours are required for the batches, or plates supporting the batches, to reach the discharge end thereof, and the batches or plates carrying the batches shift intermittently downwardly therein as the plates or batches which reach the discharge end are removed. The particles are not subjected to any appreciable disturbance as they, or the plates on which they are supported, shift downwardly through the reaction zone.

Figures 9, 10:
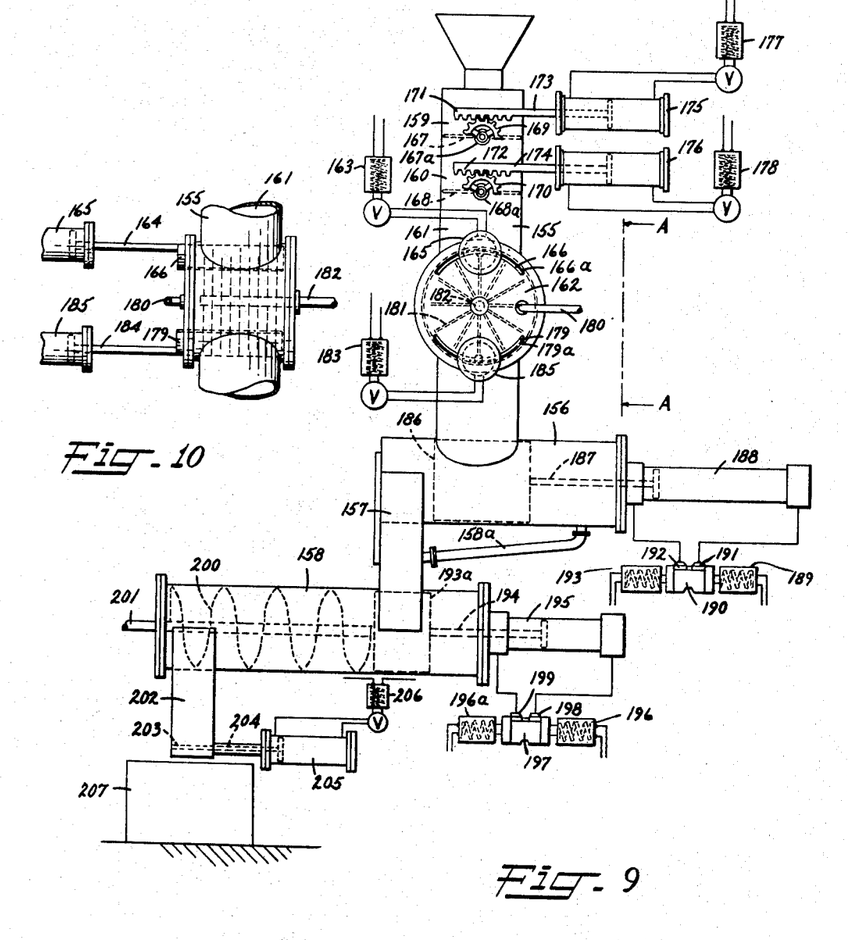
Figure 9 is an elevation of another embodiment of the invention.
Figure 10 is a view taken on line A—A of Figure 9, looking in the directions of the arrows.

Figures 9 and 10 are illustrative of still another embodiment of the invention. Referring to Figure 9, the apparatus shown comprises a vertical tower 155, a horizontal chamber 156 communicating with the bottom or discharge end of tower 155, and a horizontal chamber 158 communicating with a chute 157 leading from chamber 156. Chambers 156 and 158 constitute a reaction zone. The apparatus may be supported in any suitable manner.

Tower 155 comprises a plurality of feeding compartments or zones 159, 160 and 161, an agitating zone or chamber 162, and a compartment or chamber 162a integrally attached to and opening into the horizontal chamber or compartment 156. Compartments or zones 159, 160 and 161 are temporarily sealed from one another during operation of the device by tiltable plates or disks 167, 168 which are rotated or tilted in appropriate sequence as described more fully hereinafter.

After a batch of crumbs has been introduced into the agitating zone 162, solenoid 163, which actuates an air valve controlling movement of a rod 164 attached to a piston slidable in cylinder 165 and secured to and adapted to move an arcuate disk or plate 166, is energized so that rod 164 moves inwardly of the tower out of cylinder 165 to carry plate 166 through arcuate slot 166a into sealing position between zone 162 and feeding zone 161. Solenoid 163 remains energized until the batch is discharged from the agitating zone, whereupon it is de-energized and rod 164 is spring retracted to permit entry of a fresh batch of crumbs to the agitating zone, after which solenoid 163 is again energized and plate 166 is returned to sealing position. Plates or disks 167, 168 for sealing compartments 159, 160, 161 are journaled in bearings 167a and 168a, and are provided with ratchet wheels 169, 170 attached thereto and adapted for engagement by toothed racks 171, 172 secured to rods 173, 174 attached to pistons slidable in cylinders 175, 176. Movement of rods 173, 174 is controlled by air valves actuated by solenoids 177, 178. Solenoids 177, 178 remain energized to maintain disks 167, 168 in sealing position between the feeding zones, when all of the zones, including the agitating zone are filled with crumbs. After a batch of crumbs has been delivered from zone 161 to zone 162, and plate 166 is in sealing position, solenoid 178 is de-energized whereupon rod 174 is retracted and rack 172, by counter-clockwise movement of wheel 170, tilts plate 168 to upright position. The crumbs contained in compartment 160 drop into compartment 161, coming to rest on plate 166. Solenoid 178 is again energized to return plate 168 to sealing position. Solenoid 177 is then de-energized and rod 173 is retracted so that rack 171 by engagement with wheel 169, tilts plate 167 to upright non-sealing position, permitting the crumbs contained in compartment 159 to fall into compartment 160 and come to rest on plate 168. Solenoid 177 is again energized to return plate 167 to the sealing position, and fresh crumbs are fed into compartment 159. The crumbs may be fed into the apparatus by any suitable means such as the means shown in Figure 6. Plates 167, 168 permit continuous feeding of the crumb batches to the several zones of the apparatus, while at the same time minimizing or preventing gas escape from the system. Any gas which does escape from the reaction and agitating zones serves to pretreat the crumbs advancing through the feeding compartments 159 and 160 to the agitating zone.

After each batch of crumbs has been delivered to the agitating zone, and the zone is sealed by arcuate plates 166 and 179, carbon disulfide is introduced into the zone in measured amount through the atomizing nozzles in chamber 162 fed by pipe 180.

The amount of carbon disulfide sprayed into the agitating zone in the form of a fine mist or cloud may be controlled, for instance, by means such as shown in Figure 7. The crumbs and atomized $CS_2$ are agitated for a predetermined period by blades 181 carried on a horizontal shaft 182 which projects into the agitating zone and is driven by a solenoid-controlled motor (not shown). When an intimate physical mixture of the alkali cellulose crumbs and carbon disulfide has been obtained, and before chemical reaction therebetween has been initiated or has progressed to any appreciable extent, solenoid 183, which actuates an air-valve controlling movement of rod 184 attached to a piston slidable in cylinder 185 and secured to and adapted to move the arcuate plate or disk 179 through arcuate slot 179a is de-energized so that rod 184 is retracted and plate 179 is withdrawn from sealing position at the bottom of agitating zone 162, and the intimate physical mixture of alkali cellulose and carbon disulfide drops onto piston 186 disposed in chamber 156. Piston 186 is adapted for sliding movement against the inner wall of chamber 156 and is secured to and moved by a rod 187 attached to a piston slidable in a hydraulic cylinder 188.

Solenoid 193 is then energized, valve 190 being turned to permit water under pressure to run in from tank 192 in front of rod 187, so that piston 186 is retracted a short distance in chamber 156 and the load of crumbs is pushed off and lies in front of the piston. Solenoid 193 is then de-energized and solenoid 189 is energized, whereupon valve 190 is turned to permit water under pressure to run in from tank 191 behind the rod, water in front of the rod running back to tank 192. Piston 186 is thus moved inwardly of chamber 156, and the mass is urged along the length of the chamber wherein the chemical reaction proceeds, to chute 157 with little or no movement of the saturated crumbs relatively to one another. Solenoid 189 is then de-energized and piston 186 is returned to its original position in chamber 156.

A conduit 158a is provided so that excess gas escaping to chamber 156 is returned as such to chamber 158.

The mass dropping through chute 157 comes to rest on the outer peripheral wall of a piston 193a adapted for sliding movement against the inner wall of chamber 158 and which is secured to and moved by a rod 194, in turn secured to a piston slidable in a hydraulic cylinder 195. Solenoid 196a is then energized and valve 197 is turned to permit water under pressure to run in from tank 199, so that piston 193a is retracted, the mass being pushed off the piston so that it lies in front of the piston which, when solenoid 196a is de-energized and solenoid 196 is energized, valve 197 being turned to permit water under pressure to run in from tank 198 behind rod 194, and return of the water from in front of the rod to tank 199, is pushed inwardly of chamber 158 to urge the mass along the length of the chamber until it is picked up by a worm conveyor 200 carried by a horizontal shaft 201 which projects into chamber 158 and is driven by a solenoid-controlled motor (not shown). Conveyor 200 advances the mass to a chute 202 which is temporarily sealed by a plate or disk 203 secured to rod 204 attached to a piston slidable in cylinder 205. Movement of rod 204 is controlled by an air valve actuated by solenoid 206, the solenoid being de-energized at appropriate intervals so that rod 204 is retracted to withdraw disk 203 from sealing position to permit the batches of cellulose xanthate to drop into a collecting device 207. After a batch of cellulose xanthate is delivered to the worm conveyor, solenoid 196a is again energized and piston 193a is returned to its original position. Pistons 186 and 193a not only serve to receive the batches but also comprise effective means for sealing the apparatus against gas escape or leakage, the length of pistons 186 and 193a being such that a portion of the periphery thereof is always in receiving position with respect to the discharge end of the agitating and first reaction compartments, respectively.

The solenoids for actuating the valves controlling movement of the various rods of the apparatus shown in Figures 9 and 10 may be energized in the desired sequence through lead lines connected with any suitable timing device such as that shown in Figure 8 appropriately modified to give the sequence herein outlined.

In all of the embodiments illustrated, the crumb batches are fed into the agitating zone, agitated, discharged to the reaction zone and withdrawn from that zone in sequence and at predetermined time intervals such that the crumbs remain in the agitating zone for a time the duration of which is so limited that physical admixture of the crumbs and $CS_2$ is effected and chemical reaction is not initiated, or if initiated, does not proceed beyond the initial stage while the crumbs are subjected to agitation. This has the advantage that the $CS_2$ is uniformly distributed throughout the mass of alkali cellulose crumbs without having to depend upon absorption only, which latter does not result in uniform impregnation of the alkali cellulose or a completely and uniformly xanthated cellulose. Further, the agitator is not impeded by deposition thereon of viscous clumps comprising partially reacted materials, which makes for greater efficiency.

The cellulose xanthate obtained as final product is of superior quality and consists of a ball-less, fluffy mass of mealy consistency which dissolves very rapidly in sodium hydroxide, water or a mixture of the two. It may be converted to viscose by reaction with proportionate amounts of dilute sodium hydroxide. The viscose obtained from cellulose xanthate made in accordance with the invention is practically fiber-less, and more readily filtered than conventional viscoses, and is characterized by improved spinnability. The absence of excess carbon disulfide in the xanthate produced as described herein minimizes the possibility of by-products being formed due to reaction between carbon disulfide and the sodium hydroxide solvent for the xanthate, so that the artificial fibers and other products obtained by coagulation of the viscose and regeneration of the cellulose are of exceptionally fine quality.

Although the invention has been illustrated and described in terms of certain specific embodiments, it will be obvious that many modifications may be made therein without departing from the spirit and scope of the invention or of the appended claims.

We claim:

1. An apparatus for producing cellulose xanthate comprising three chambers arranged in superimposed relation with the discharge opening of the uppermost chamber aligned with the inlet opening of the intermediate chamber and the discharge opening of the intermediate chamber aligned with the inlet opening of the lowermost chamber, means in the uppermost chamber for dividing the same into compartments comprising plate-like members supported for pivotal movement one above the other in spaced relation, means for pivoting the plate-like members through an arc of 90° intermittently and sequentially, an agitating means in the intermediate chamber, liquid spraying means projecting into the intermediate chamber, solenoid actuated valve means connected to the liquid spraying means for automatically controlling the amount of liquid delivered to the liquid spraying means, an arcuate plate-like sealing means positioned adjacent the discharge opening of the uppermost chamber, an arcuate plate-like sealing means positioned adjacent the discharge opening of the intermediate chamber, means for intermittently inserting and withdrawing the sealing means into and out of sealing position, a closure member positioned adjacent the discharge opening of the lowermost chamber, and means for intermittently inserting and withdrawing said closure member into and out of sealing position at said opening.

2. An apparatus as defined in claim 1 having cellulose feeding means connected to the uppermost chamber.

3. An apparatus as defined in claim 1 wherein all of said means are actuated by solenoid actuated fluid pressure means.

4. An apparatus as defined in claim 3 having cellulose feeding means connected to the uppermost chamber, and a time regulated central electrical control for periodically and sequentially actuating all of said means.

5. Apparatus comprising three vertically superimposed vessels, the intermediate vessel being cylindrical and disposed with its axis approximately horizontal, each of said vessels being connected to an adjacent one of the vessels to receive a material from above and to discharge it downwardly through the several vessels in succession, at least one plate in the uppermost vessel of the three for dividing it into vertically spaced compartments, said plate being rotatable on an axis transverse to the vessel and having a shape and size approximately the same as the internal cross-section of the vessel, means for rotating the plate about its axis, means for selectively closing and opening the junctures between the intermediate vessel and the other vessels comprising an arcuate closure member, and movable means at the bottom of the lowermost vessel to support the contents thereof and to control their discharge.

6. Apparatus according to claim 5 comprising means for actuating the plate-rotating means and the sealing means sequentially to effect step-by-step transfer from compartment to compartment and vessel to vessel.

7. Apparatus according to claim 5 in which there are a plurality of said rotatable plates in the upper of the three vessels and each is connected to its individual rotating means.

8. Apparatus according to claim 5 comprising an agitator in the intermediate vessel mounted rotatably on the axis of said vessel, and spray means for introducing a liquid into the intermediate vessel.

9. A unitary treating tower assembly for continuously producing cellulose xanthate from alkali cellulose crumbs comprising an agitating chamber, means for introducing alkali cellulose crumbs into said agitating chamber, means for introducing carbon disulfide into said agitating chamber, an agitator in said chamber, a sequentially actuated closure between the alkali cellulose introducing means and the agitating chamber to intermittently charge the chamber with batches of alkali cellulose crumbs, a reaction chamber contiguous to and forming a continuation of the agitating chamber, at least one closure means movable with respect to the interior of said reaction chamber for intermittently closing and fluid sealing the reaction chamber from the agitating chamber, walls defining a discharge opening for the reaction chamber, and a closure for said discharge opening.

10. Apparatus in accordance with claim 9 having solenoid controlled means for moving the closure means between the agitating chamber and the reaction chamber into closing position.

11. Apparatus in accordance with claim 9 having solenoid controlled means for moving the closure for the discharge opening into and out of closing position.

12. Apparatus in accordance with claim 9 having solenoid controlled means for sequentially introducing and removing a plurality of closure members to and from the interior of the reaction chamber.

13. Apparatus in accordance with claim 9 in which at least a part of the reaction chamber is a hollow, vertically positioned tower directly below the agitating chamber and positioned to receive a batch of alkali cellulose crumbs discharged from the agitating chamber by gravity.

14. Apparatus in accordance with claim 13 having means for controlling the passage of individual batches of cellulose crumbs through the reaction chamber.

15. Apparatus in accordance with claim 14 having means for intermittently sealing both ends of the reaction and agitating chambers to prevent the escape of gas therefrom.

16. Apparatus in accordance with claim 15 having solenoid actuated fluid pressure means for operating the intermittent sealing means.

17. A unitary treating tower assembly for continuously producing cellulose xanthate from alkali cellulose crumbs comprising an agitating chamber, means for introducing alkali cellulose crumbs into said agitating chamber, means for introducing carbon disulfide into said agitating chamber, an agitator in said chamber, a sequentially actuated closure between the alkali cellulose introducing means and the agitating chamber to intermittently charge the chamber with batches of alkali cellulose crumbs, a reaction chamber contiguous to and forming a continuation of the agitating chamber, at least one closure means movable with respect to the interior of said reaction chamber for separating batches of alkali cellulose crumbs and sequentially depositing said batches into the reaction chamber, walls defining a discharge opening for the reaction chamber, and a closure for said discharge opening.

18. A unitary treating tower assembly for continuously producing cellulose xanthate from alkali cellulose crumbs comprising a reaction tower, a plurality of closure members movable in said tower and progressively separating sections of the tower from each other, a support for said tower, an agitating chamber positioned above and contiguous to said reaction tower, means for introducing alkali cellulose crumbs into said agitating chamber, means for introducing carbon disulfide into said agitating chamber, an agitator in said chamber, a closure housing having a plurality of closure members slidable therethrough between the agitating chamber and the reaction tower, said housing having guide means through which the closure members are inserted into the closure housing, means for retaining a closure member in the closure housing and depositing the member and a charge of unreacted cellulose xanthate into the reaction tower, means at the bottom of the reaction tower for individually removing each closure member from the tower together with a charge of reacted cellulose xanthate supported on said closure member.

19. A unitary treating tower assembly for continuously producing cellulose xanthate from alkali cellulose crumbs comprising a reaction tower, a plurality of closure members movable in said tower and progressively separating sections of the tower from each other, a support for said tower, an agitating chamber positioned above and contiguous to said reaction tower, means for introducing alkali cellulose crumbs into said agitating chamber, means for introducing carbon disulfide into said agitating chamber, an agitator in said chamber, a closure housing having a plurality of closure members slidable therethrough between the agitating chamber and the reaction tower, said housing having guide means through which the closure members are inserted into the closure housing, a supply of closure members adjacent said guide means, means for selectively transferring an individual closure member from the supply into the closure, means for retaining a closure member in the closure housing and depositing the member and a charge of unreacted cellulose xanthate into the reaction tower, means at the bottom of the reaction tower for individually removing each closure member from the tower together with a charge of reacted cellulose xanthate supported on said closure member.

20. A unitary treating tower assembly for continuously producing cellulose xanthate from alkali cellulose crumbs comprising a vertical reaction tower of substantial height, a support for said tower, an agitating chamber positioned above and contiguous to said reaction tower, a plurality of closure members slidable through said reaction tower, means for intermittently introducing batches of alkali cellulose crumbs into said agitating chamber, means for intermittently introducing predetermined amounts of carbon disulfide into said agitating chamber, an agitator in said chamber, a closure housing between the agitating chamber and the reaction tower for sequentially introducing closure members into the reaction tower, a supply of closure members adjacent said housing, means for selectively transferring individual closure members from said supply into the housing, means for retaining an individual closure member in the closure housing in line with the bore of the reaction tower, means for releasing said retaining means to permit the individual closure member together with a batch of alkali cellulose crumbs to pass downwardly into the reaction tower, means adjacent the bottom of the reaction tower for intermittently supporting and sealing a plurality of the closure members and their associated batches of alkali cellulose crumbs, a platform vertically movable below said supporting means, means for vertically reciprocating said platform to receive and support the stack of closure members when the first-named supporting means is open, and to lower an individual closure member and its associated batch of cellulose xanthate when the supporting member is closed, means for removing said discharged closure member and batch of cellulose xanthate from the platform.

21. A unitary treating tower assembly for continuously producing cellulose xanthate from alkali cellulose crumbs comprising a vertical reaction tower of substantial height, a support for said tower, an agitating chamber positioned above, and contiguous to, said reaction tower, means for introducing alkali cellulose crumbs into said agitating chamber, means for introducing carbon disulfide into said agitating chamber, an agitator in said chamber, a closure housing between the agitating chamber and the reaction tower, said housing having laterally extending guide means through which a plurality of separators are selectively inserted into the closure housing, a supply of separators adjacent said guide means, means for selectively transferring an individual separator from the supply into the closure housing, means for retaining a separator member in the closure housing and depositing the separator and a charge of unreacted cellulose xanthate into the reaction tower on top of previously deposited separators, means for supporting the stacked separators and interposed batches of cellulose xanthate in the tower, means for selectively displacing said supporting means to permit individual separators to move downwardly from the tower, a platform on which said separator and its associated charge of cellulose xanthate is deposited, a retaining member movably supported on said platform for keeping the cellulose xanthate on the separator, means for lowering said platform to a discharge position, means in line with said discharge position for laterally displacing the retaining member and the closure member off of the platform, and means for directing the closure member and the cellulose xanthate batch to a position remote from the base of the reaction tower.

References Cited in the file of this patent

UNITED STATES PATENTS

| Number | Name | Date |
|---|---|---|
| 1,352,655 | Buchanan | Sept. 14, 1920 |
| 1,361,325 | Grunwald | Dec. 7, 1920 |

FOREIGN PATENTS

| Number | Country | Date |
|---|---|---|
| 18,792 | France | May 8, 1857 |